United States Patent [19]

Biddick et al.

[11] 3,751,304

[45] Aug. 7, 1973

[54] STABILIZATION OF BORON PHOSPHATE SULFURIC ACID GELS

[75] Inventors: Royce E. Biddick, Edina, Minn.; John B. Ockerman, Levittown, Pa.

[73] Assignee: The United States of America as represented by the Secretary of the Army, Washington, D.C.

[22] Filed: Feb. 24, 1971

[21] Appl. No.: 118,485

[52] U.S. Cl.................................. 136/158, 252/317
[51] Int. Cl.............................................. H01m 9/04
[58] Field of Search.................... 136/153, 157, 158; 252/317

[56] References Cited
UNITED STATES PATENTS

| 3,556,860 | 1/1971 | Amlie | 136/157 |
| 3,067,275 | 12/1962 | Soloman | 136/157 |
| 1,403,462 | 1/1922 | Williams | 136/157 |
| 3,457,112 | 7/1969 | Reber | 136/157 |
| 3,244,564 | 4/1966 | Fox | 136/158 |

FOREIGN PATENTS OR APPLICATIONS

| 975,695 | 11/1964 | Great Britain | 136/157 |

OTHER PUBLICATIONS

Leicester, The Gelling of Concentrated Sulphuric Acid and Oleum, J. Soc. Chem. Ind. (London), Vol. 67, pages 433–444 (1948).

*Primary Examiner*—Donald L. Walton
*Attorney*—Harry M. Saragovitz, Edward J. Kelly, Herbert Berl and Robert M. Lyon

[57] ABSTRACT

A method is described for preventing the release of liquid from a sulfuric acid boron phosphate gel used in water activated lead acid storage batteries, and more particularly the addition of an excess amount of aluminum metal, magnesium or lithium aluminum hydride to this gel.

1 Claim, No Drawings

STABILIZATION OF BORON PHOSPHATE SULFURIC ACID GELS

CROSS-REFERENCES TO RELATED APPLICATIONS

A patent application, Ser. No. 115,132, now abandoned, for the immobilization of boron phosphate sulfuric acid gels was filed in the U.S. Pat. Office Feb. 12, 1971 disclosing the use of aluminum, calcium and magnesium and their oxides and hydroxides as immobilizing agents but not in excessive quantities which would enable the gel composition to remain in almost the same concentration for a prolonged period of time during inactivity. Additionally no provision was made in that earlier application for the use of lithium aluminum hydride as a stabilizing or immobilizing agent in boron phosphate sulfuric acid.

BACKGROUND OF THE INVENTION

1. Field of the Invention

Secondary cells, otherwise known as storage batteries, are ones in which the conversion of chemical energy to electrical energy is reversible. In this system the electrical energy remains stored as chemical energy for whatever period the particular system is capable of retaining it.

Secondary cells consist of two lead gratings that function as electrodes, or conductors used to establish electrical contact with a nonmetallic part of a circuit. The openings in one of the aforementioned lead gratings or electrodes, the cathode being the positive electrode and the anode the negative electrode, are filled with spongy lead (Pb) and the other with lead dioxide ($PbO_2$). When an active metal is immersed in water, or other chemically active solution, there is a tendency for that metal to go into solution as electrically charged particles of that metal or ions. The electrons that are given up by the atoms remain on the metal and impart a negative charge to it.

A typical lead acid storage battery requires a large number of thin plates, from about two to about 20 per cell, to supply the necessary currents. Other lead batteries are made with fewer and thicker plates where heavy currents are not required but a longer life is desired.

A typical lead acid storage battery utilizes a lead framework or grid as support for active material. A paste consisting primarily of lead oxide and sulfuric acid is applied to this grid and then dried and cured. The plates are then assembled and placed into a container. The grid itself is a lattice work which supports the active material and conducts an electric current to the battery terminals, located at the cathode and anode poles.

Storage battery grids are usually made from lead containing from about 7 percent to about 12 percent antimony.

The oxide used for the negative plates contains about 1 percent of materials called expanders. These are comprised of carbon black, barium sulfate, and an organic material usually derived from the lignin fraction of wood. These expanders prevent a deteriortation of plate capacity and shrinking of the sponge lead as well as improve the capacity during a high rate low temperature discharge.

After the plates have been cured they are assembled and given their first charge which is carried out in dilute sulfuric acid at a specific gravity of about 1.100, since a higher strength acid retards charge. After this initial, or forming charge, the acid is replaced by a stronger acid. Maximum initial capacity for cold weather operation is attained with a sulfuric acid having a specific gravity of 1.300, for high temperature operation a much better performance is attained with an acid having a specific gravity of 1.220. Most batteries are made with 1.250 to 1.275 specific gravity sulfuric acid measured at 80° F. The initial charge process converts the negative plate to sponge lead and the positive plate to lead dioxide.

The openings in one of the aforementioned lead gratings or electrodes, cathode being the positive and anode the negative electrode, are filled with spongy lead (Pb) and the other with lead dioxide ($PbO_2$). The rubberized casing further encloses an electrolyte composed of a mixture of pure water and sulfuric acid. When an active metal is immersed in water, or other chemically active solution, there is a tendency for that metal to go into solution as electrically charged particles of that metal or ions. The electrons that are given up by the atoms remain on the metal and impart a negative charge to it. When the battery is operating, discharging, the sulfate ions ($SO_4^-$) move to the spongy lead electrode and form lead sulfate ($PbSO_4$). The lead atoms lose two electrons to form lead ions ($Pb^{+2}$). Some of the lead sulfate goes into solution but most of it remains on the electrode as a white deposit. The electrode becomes negatively charged:

$$Pb^0 \rightarrow Pb^{+2} + 2(e^-)$$

$$Pb^{+2} + SO_4^{-2} \rightarrow PbSO_4$$

At the other electrode lead dioxide also changes to lead sulfate. The electrons given up at the negative electrode reduce the lead oxide ($PbO_2$):

$$PbO_2 + 4H_3O^+ + 2e \rightarrow Pb^{+2} + 6H_2O$$

$$Pb^{+2} + SO_4^{-2} \rightarrow PbSO_4$$

Thus, lead sulfate also deposits on the positive electrode. Lead oxide is oxidized at the anode to lead sulfate and at the cathode lead oxide is reduced to lead sulfate. When the cell is discharged, both electrodes are covered with lead sulfate and much of the sulfuric acid is removed from the solution, lowering its density. The discharaged cell may be recharged by passing a low voltage, 3 to 6 volts, current through the cell in the reverse direction to the discharged current. The electrode reactions are reversed and lead, lead dioxide, and sulfuric acid are formed.

$PbSO_4 + 2e \rightarrow Pb^{+2} + SO_4^=$
(at the anode)
$PbSO_4 + 6H_2O \rightarrow PbO_2 + 4H_3O^+ + SO_4^= + 2e$
(at the cathode)

2. Description of the Prior Art

An ideal rechargeable storage battery should embody certain desirable characteristics some of which have so far eluded its developers and manufacturers. A secondary storage battery should be efficient in terms of the ratio of discharge energy to charging energy; it should be unharmed by high rates of charge or discharge, or by overcharge, and likewise by overdischarge, or by long periods of standing in a charged or in an uncharged condition; it should require the minimum of attention, such as electrolyte replacement.

The most efficient and simple concept in counteracting the hyperactivity of the concentrated sulfuric acid electrolyte in a lead storage battery has been the addition of small amounts, in a mole ratio of 1:50 of boron phosphate ($BPO_4$) to the concentrated sulfuric acid ($H_2SO_4$). The addition of boron phosphate immobilizes the sulfuric acid and makes it more stable and capable of standing over a much longer period of time.

The principal disadvantage of a boron phosphate sulfuric acid electrolyte gels is their tendency to release liquid due to contraction of the gel structure. This liquid acid causes severe damage to the elements and containers of water activated lead acid storage batteries in which sulfuric acid is stored internally in the form of a boron phosphate sulfuric acid gel.

It is an object of our invention to immobilize the sulfuric acid in boron phosphate sulfuric acid gels and further prevent a release of liquid which in turn attacks the elements and even further cause internal damage to other components of the storage battery.

Yet another object of the object invention is to select such agents or inhibtors which will prevent a reaction between the electrolyte acid and the battery elements.

SUMMARY OF THE INVENTION

In preparing boron phosphate sulfuric acid gels the addition of small amounts of aluminum, magnesium, and sometimes calcium or certain compounds of these metals improves the properties of this electrolyte gel by further immobilizing the sulfuric acid.

The boron phosphate-sulfuric acid which is to be immobilized is divided into two equal parts. Boric acid ($H_3BO_4$) is dissolved in onepart and phosphoric acid ($H_3PO_4$) added to the second portion of the sulfuric acid. These two solutions are stable until mixed after which boron phosphate is formed as an opalescent gel. The acid density of this gel is very high since the mole ratio of boron phosphate to sulfuric acid is typically 1:50.

Since a boron phosphate-sulfuric acid gel has a tendency to release liquid due to contraction of the gel structure, some preventive recourse must be made available to overcome this shortcoming. Such beneficial effects are attained by the addition of small amounts of aluminum (Al), magnesium (Mg), and sometimes calcium (Ca), or certain compounds of these elements. Such gels are more stable than gels consisting of boron phosphate-sulfuric acid alone).

Aluminum, calcium, or magnesium, in metallic state, is dissolved in the boric acid solution used in the preparation of a sulfuric acid gel containing 2 mole precent boron phosphate. The result of these additions is the formation and dispersion of sulfates of these metals throughout the gel structure. When a sufficient quantity of any of these metals is added to the gel, some remains unreacted after the reaction has proceeded as far as possible. As a final reaction product a gel forms containing boron phosphate, a sulfate of aluminum, magnesium or calcium, and metallic aluminum, magnesium or calcium. A potential advantage of a gel of this composition is that the presence of the unreacted metal in particular confers an additional resistance to release of liquid during long term storage in batteries. The function of the metallic aluminum, magnesium or calcium is to react with and tie up the water, which is absorbed from the cell components or by diffusion through container walls, in the form of hydrated sulfates and thereby preventing the formation and release of a liquid phase. The same results are obtained with the addition of lithium aluminum hydride.

This compound is effective in improving the water tolerance of boron phosphate sulfuric acid gels. Lithium aluminum hydride (LiAlH) reacts with water

to form lithium hydroxide (LiOH), aluminum hydroxide [$Al(OH)_3$] hydrogen ($H_2$). The hydroxides are subsequently converted to sulfates ($SO_4^=$) and the hydrogen ($H_2$) escapes by diffusion through the cell walls.

The following examples will serve to illustrate the preparation of a boron phosphate sulfuric acid gel with a stabilizing agent containing magnesium.

EXAMPLE I

Approximately 1 gram atom of aluminum metal in fine powder form is added to the sulfuric acid boron phosphate solution gel per 20 gram moles of sulfuric acid. After the mixture is stirred for approximately 20 minutes, until no further reaction occurs, a gel forms containing boron phosphate, aluminum sulfate, and undissolved metallic aluminum. Magnesium and calcium will yield similar results.

Example II

Approximately 0.01–0.10 milliequivalents of lithium aluminum hydride per equivalent amount is dissolved in the sulfuric acid boron phosphate gel solution per 30 gram moles of sulfuric acid. After the mixture is stirred for approximately 25 minutes until no further reaction takes place, a gel forms containing lithium hydroxide (LiOH), aluminum hydroxide ($Al(OH)_3$) and hydrogen ($H_2$).

Thus a gel containing undissolved aluminum or magnesium confers an additional resistance to release of liquid during prolonged storage in batteries. Since a major cause of gel breakdown is absorbtion of water from the surrounding cell components or by diffusion through the container walls, the presence of unreacted metallic aluminum and magnesium will tie up this water, by reacting with it, in the form of hydrated sulfates and prevent the formation and release of a liquid phase.

The invention has been illustrated by specific embodiments, but, as will be obvious to those skilled in the art, the details may be varied widely without departing from the scope or spirit of our invention.

What we claim is:

1. An improved process of stabilizing boron phosphate sulfuric acid gels which comprises the steps of preparing a boron phosphate sulfuric acid gel mixture, and adding metallic aluminum in a fine powder form to said gel in a concentration of approximately 1 gram atom per 20 gram moles of concentrated sulfuric acid.

* * * * *